US006620306B2

(12) United States Patent
Yoshimura et al.

(10) Patent No.: US 6,620,306 B2
(45) Date of Patent: Sep. 16, 2003

(54) METHOD OF MANUFACTURING ELECTRODE FOIL FOR ALUMINUM ELECTROLYTIC CAPACITOR AND AC POWER SUPPLY UNIT

(75) Inventors: Mitsuhisa Yoshimura, Kadoma (JP); Takehiko Nakahara, Kyoto (JP); Kazunari Hayashi, Uji (JP); Hiromi Nakanishi, Kyoto (JP); Naomi Kurihara, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 31 days.

(21) Appl. No.: 09/993,628

(22) Filed: Nov. 27, 2001

(65) Prior Publication Data

US 2002/0092777 A1 Jul. 18, 2002

(30) Foreign Application Priority Data

| Nov. 29, 2000 | (JP) | ......................... 2000-362283 |
| Nov. 29, 2000 | (JP) | ......................... 2000-362284 |
| Jun. 27, 2001 | (JP) | ......................... 2001-194121 |

(51) Int. Cl.$^7$ ............................................... B23H 3/00
(52) U.S. Cl. ........................................ 205/640; 205/107
(58) Field of Search .................. 205/640, 106, 205/107, 111, 324, 646, 659, 674, 677, 684, 644

(56) References Cited

U.S. PATENT DOCUMENTS

| 4,297,184 A | * | 10/1981 | Dyer ........................... 205/646 |
| 5,328,573 A | * | 7/1994 | Kawasumi et al. .......... 205/650 |
| 6,146,515 A | * | 11/2000 | Gutierrez et al. ............. 205/81 |

FOREIGN PATENT DOCUMENTS

| JP | 51-25439 | 3/1976 |
| JP | 61-158133 | 7/1986 |
| JP | 2-66925 | 3/1990 |
| JP | 2-211614 | 8/1990 |
| JP | 10-163073 | 6/1998 |

* cited by examiner

*Primary Examiner*—Roy King
*Assistant Examiner*—Wesley A. Nicolas
(74) *Attorney, Agent, or Firm*—Wendroth, Lind & Ponack, L.L.P.

(57) ABSTRACT

A method of manufacturing electrode foil for aluminum electrolytic capacitors and an AC power supply unit used therewith are disclosed. An etching is performed on an aluminum foil immersed in an electrolytic solution by applying an AC current to a pair of electrodes in the electrolytic solution. A waveform of the AC current is a deformed sine wave including a period of time (a) when an electric current rises from zero to a peak value, and another period of time (b) when the electric current falls from the peak value to zero. With the periods of time (a) and (b) made different from each other, the surface area of the aluminum foil is efficiently expanded by the etching and an enhancement of electric capacity of the electrode foil is obtained.

27 Claims, 7 Drawing Sheets

METHOD OF MANUFACTURING ELECTRODE FOIL FOR ALUMINUM ELECTROLYTIC CAPACITOR AND AC POWER SUPPLY UNIT

FIELD OF THE INVENTION

The present invention relates to a method of manufacturing electrode foil for aluminum electrolytic capacitors and an alternative current (AC) power supply unit used in the manufacturing method. More particularly, the present invention relates to a method of manufacturing and an AC power supply unit involving the technologies most suitably used in an etching of an anode foil for low voltage aluminum electrolytic capacitors.

BACKGROUND OF THE INVENTION

In recent years as the equipment in which aluminum electrolytic capacitors are used has been reduced in size and enhanced in reliability, requirements from users of the aluminum electrolytic capacitors for a reduction in size, as well as a reduction in cost of the capacitors are rapidly increasing. As a result, greatly increased electric capacity per unit area of electrode foil used in aluminum electrolytic capacitors has been required.

Among the aforementioned electrode foil, an anode electrode foil for low voltage aluminum electrolytic capacitors is produced in the following manner. At first, electrochemical or chemical etching surface treatments are applied to aluminum foil to expand the surface area thereof. Then, the aluminum foil is washed to form a hydrate film on the surface thereof, followed by a drying of the foil to finish the etched foil. Afterwards, an anodizing treatment is applied to the etched foil to perform anode oxidation, thus finishing the production of the anode foil.

As a result of the etching surface treatments applied to aluminum foil, as described above, great number of etched pits are formed step by step inside the aluminum foil as the step of performing the etching process is repeated. The etching processes are performed in a electrolytic solution mainly comprised of hydrochloric acid, while alternating currents are applied.

In general, a mechanism of an alternating current etching process is known as follows. A hydrate film is formed on the surface of aluminum when a cathode current flows on the surface and pits are formed at the places where the hydrate film has defects at the time when an anode current flows. By repeating this reaction with alternating currents being applied, etch pits are formed in the aluminum foil. By devising or improving the composition of the electrolyte and the etching conditions such as a current density and frequencies of the alternating currents, etched foil characteristics such as electric capacity, mechanical strength and the like, have been enhanced.

In the step of performing the etching process, in which alternating currents are applied to aluminum foil in a electrolytic solution that is mainly comprised of hydrochloric acid, a sine wave is used as the waveform of the alternating currents, as shown in FIG. 10, and an increase of the surface area of aluminum foil is obtained by adjusting the frequencies of the sine wave. However, an excessive increase of the surface area of the aluminum foil results in a reduction of mechanical strength of the aluminum foil, thus presenting a problem that there is a limit to the increase in the surface area of aluminum foil.

Although an etching process employing a rectangular wave, a triangular wave and the like, as the waveform of alternating currents have been tried, it became rather difficult to further increase the surface area of aluminum foil. In addition, as is shown in the Japanese Patent Laid-Open Unexamined Publications S51-25439, S61-158133, H2-66925, H2-211614, H10-163073 and the like, a variety of electric current waveforms are proposed for use in the alternating current etching process. However, even with those improved technologies, it is hard to satisfy the requirements for electrode foil for aluminum electrolytic capacitors requested in recent years.

The present invention addresses the problems as described above and aims to provide a method of manufacturing electrode foil for aluminum electrolytic capacitors and an alternating current power supply unit used therein. The method and unit allow the electric capacity of electrode foil to be enhanced via an increase of the surface area of aluminum foil by forming closely formed, high-density etch pits in consideration of such factors as a chemical dissolving reaction, an electrochemical reaction and a diffusion phenomenon involving the aluminum foil.

SUMMARY OF THE INVENTION

A method of manufacturing electrode foil for aluminum electrolytic capacitors of the present invention is characterized by applying alternating currents to a pair of electrode plates in a electrolytic solution in etching processing of aluminum foil. The method employs, as the waveforms of alternating currents between the anode and cathode, a deformed sine wave that has a different period of time between a portion where the current rises from zero to a peak value and a portion where the current falls from the peak value to zero. More specifically, during the period of time when the current rises from zero to the peak value, uniform and closely formed etch pits are produced and then, during the next period of time when the current falls from the peak value to zero, etch pits are grown to have a high density, thereby expanding the surface area of aluminum foil efficiently. As a result, the electric capacity of electrode foil for aluminum electrolytic capacitors is increased.

In other words, by applying a great amount of electricity to aluminum foil in such a short period of time when the electric current rises from zero to the peak value, uniform and closely formed etch pits are produced, and then during the next period of time when the electric current falls from the peak value to zero, the etch pits are grown to have a high density while the etch pits being produced, thereby allowing the surface area of aluminum foil to be expanded efficiently.

In addition, when the peak value of the deformed sine wave current is made to be the same as the peak value of a conventional sine wave current, a root-mean-square (rms) value and a mean value of the electric current are made to be the same. This allows the production conditions involving the alternating currents to be easily set in comparison with a case where a rectangular waveform or a triangular waveform is used and consequently, allows the electric capacity per unit amount of electricity to be increased.

A hydrate of aluminum is produced on the cathode of alternating currents and etch pits are formed on the anode from defects of the hydrate of aluminum. The etch pits are uniformly distributed in location without depending on the conditions of the defects of the hydrate, since the current density during the initial period of time when the current rises becomes particularly high. The observation of the current waveform in the anode shows this fact. In addition, it is preferred that the waveforms of the deformed sine wave applied to the anode and cathode are made to be symmetrical.

When the period of time when the current falls exceeds 120 where the period of time when the current rises is taken as 1 (i.e., the period of time when the current rises becomes shorter than another period of time), the reaction during the current rising period becomes too abrupt, thereby producing excessively fine etch pits. These excessively fine etch pits increase the apparent surface area of aluminum foil, but at the same time increase electrical resistance inside the respective etch pits, thereby prohibiting the electric capacity to be utilized effectively. Therefore, an average etch pit diameter ranging from 0.15 μm to 2.8 μm is appropriate. Also, whenever the period of time when the current falls is less than 1.05, etch pits are not allowed to be uniformly distributed in location, thereby preventing the surface area of aluminum foil from being expanded.

DESCRIPTION OF THE PREFERRED EMBODIMENTS

First Embodiment

A description is given of a method of manufacturing electrode foil for aluminum electrolytic capacitors in a first embodiment of the present invention.

First, aluminum foil of 100 μm in thickness and 99.98% in purity is immersed in a 90° C. aqueous solution containing 1.0 weight (wt) % of phosphoric acid for 60 seconds as pretreatment.

Figure 1:
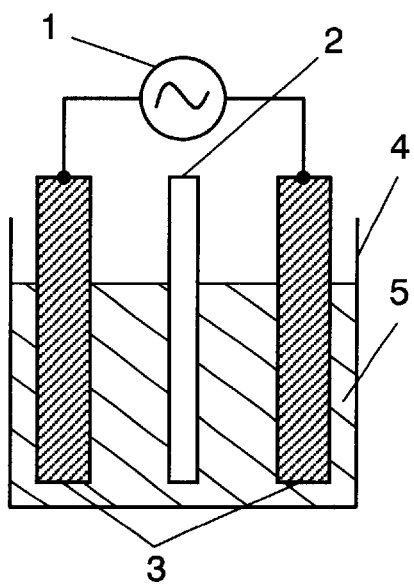
FIG. 1 is a cross-sectional view of an etching vessel used in a manufacturing method of electrode foil for aluminum electrolytic capacitors of the present invention.

Next, a description is given of an etching process with reference to FIG. 1. As FIG. 1 shows, a pair of electrodes 3 and aluminum foil 2 are immersed in or etching vessel 4 filled with 30° C. electrolytic solution 5 containing 5 wt % of hydrochloric acid, 2 wt % of aluminum chloride, 0.1 wt % of sulfuric acid, 0.5 wt % of phosphoric acid and 0.2 wt % of nitric acid (aluminum ion concentration in electrolytic solution 5 is adjusted to 0.1 wt % 0wt %).

Figure 2:
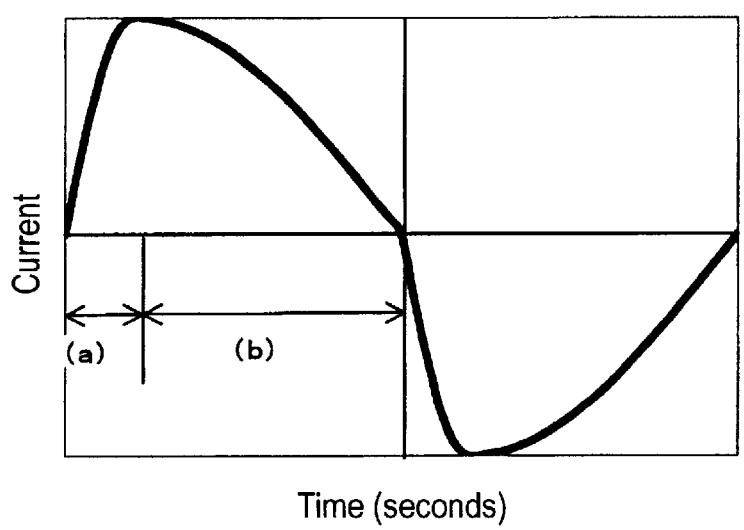
FIG. 2 is a waveform diagram illustrating a deformed sine wave of alternating currents used in a first and third through fifth embodiments of the present invention.

An etching process is performed by applying an alternating current (hereafter AC) with a deformed sine wave to the pair of electrodes 3 from AC power supply unit 1 for 300 seconds. At this time, AC power supply unit 1 is adjusted to a current density of 0.5 A/cm$^2$ and a frequency of 40 Hz and the waveform of the deformed sine wave has different waveforms between a period of time (a) when the electric current rises from zero to a peak value, and a period of time (b) when the electric current falls from the peak value to zero, as shown in FIG. 2. The etching process is performed by setting the period of time (b) where the electric current falls from the peak value to zero as 1.02, 1.05, 1.1, 1.5, 2.0, 10, 30, 50, 70, 90, 110, 120 and 130, respectively, while the period of time (a) where the electric current rises from zero to the peak value is defined as 1.

Figure 3:
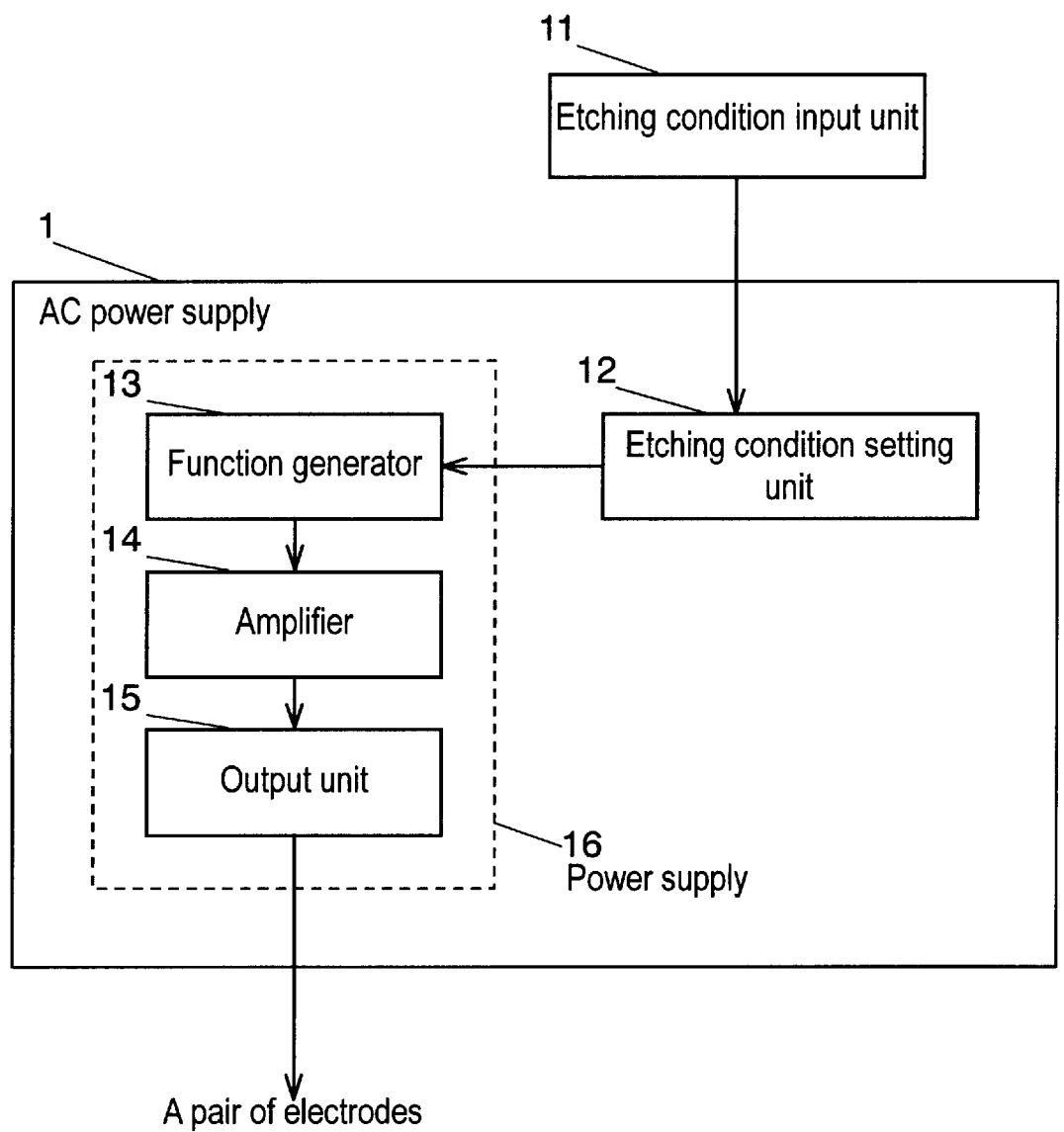
FIG. 3 is a block diagram of an alternating current power supply unit used in the embodiments of the present invention.

A desired condition for the etching process is input in advance to the AC power supply unit 1 via an etching condition input unit 11, as shown in FIG. 3. The etching condition input to the AC power supply unit 1 is converted to an electric signal in an etching condition setting unit 12, which is then send to a function generator 13 of a power supply 16, where a function of a deformed sine wave is calculated based on frequencies and currents. An actual output current obtained by the calculation is amplified in an amplifier 14 and applied to the pair of electrodes 3 via an output unit 15.

Finally, the aluminum foil 2 is immersed in a 60° C. aqueous solution containing 10 wt % of sulfuric acid for 100 seconds and then heat treated for 120 seconds at 250° C., thereby producing etched foil that serves as electrode foil for aluminum electrolytic capacitors.

COMPARATIVE EXAMPLE 1

Figure 10:
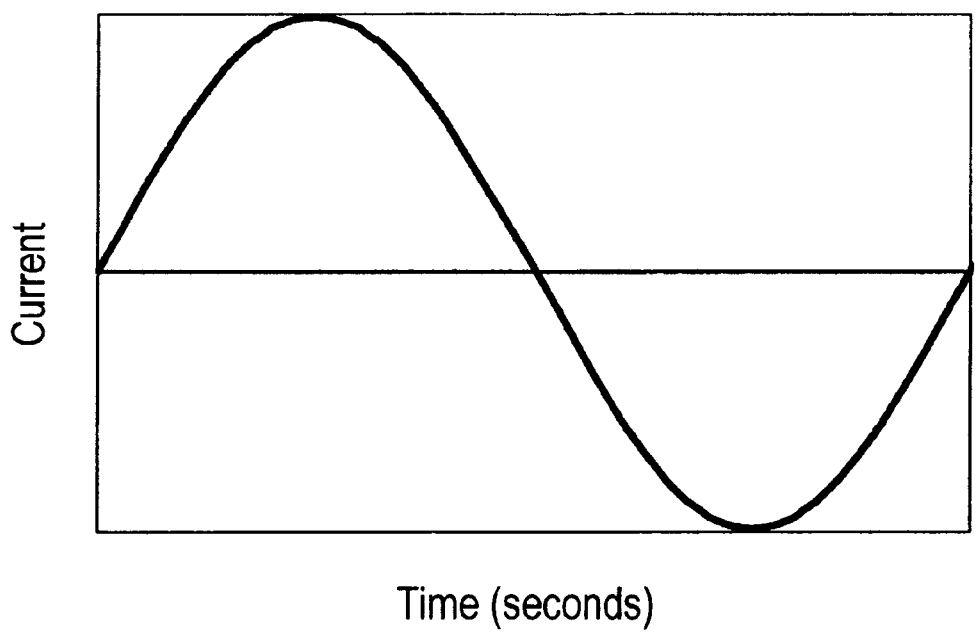
FIG. 10 is a waveform diagram of a sine wave of alternating currents used in a conventional manufacturing method of electrode foil for aluminum electrolytic capacitors and in comparative examples 1 to 5.

Etched foil is prepared in the same way as in the first embodiment described above, except for performing an etching process by the use of an AC power supply unit with an AC current having the waveform of a sine wave (the ratio between the period of time when the electric current rises from zero to the peak value and the period of time when the electric current falls from the peak value to zero is 1:1) as shown in FIG. 10.

Evaluation results of characteristics of the etched foil prepared in the first embodiment and comparative example 1 are shown in Table 1. The evaluation of the foregoing etched foil is conducted in accordance with the Standards of Electronic Industries Association of Japan (EIAJ : RC-2364A) and the values of electric capacity are based on the electric capacity of comparative example 1 taken as 100.

As is clearly seen in Table 1, when the period of time (a) when the current rises in the deformed sine wave is taken as 1, the surface area of aluminum foil 2 is expanded efficiently by keeping the period of time (b) when the current falls in a range from 1.05 to 120 in the waveform in FIG. 2. The electric capacity of the etched foil therefore can be increased. On the other hand, when the period of time (a) is taken as 1, and the period of time (b) is less than 1.05, the electric capacity obtained by the etched aluminum foil 2 is almost equal to the electric capacity of the comparative example 1.

TABLE 1

| | Time ratio of deformed sine wave | | EIAJ (RC-2364A) test results | | |
|---|---|---|---|---|---|
| | rise time (a) | fall time (b) | relative capacitance | film withstand voltage (Vt) | automatic bending test (times) |
| first embodiment | 1.0 | 1.02 | 101 | 22.9 | 125 |
| | 1.0 | 1.05 | 103 | 23.5 | 124 |
| | 1.0 | 1.10 | 105 | 23.7 | 126 |
| | 1.0 | 1.50 | 106 | 23.6 | 123 |
| | 1.0 | 2.0 | 107 | 23.4 | 121 |
| | 1.0 | 10.0 | 109 | 23.5 | 124 |
| | 1.0 | 30.0 | 111 | 23.6 | 123 |
| | 1.0 | 50.0 | 112 | 23.8 | 125 |
| | 1.0 | 70.0 | 113 | 23.5 | 124 |
| | 1.0 | 90.0 | 114 | 23.6 | 122 |
| | 1.0 | 110 | 116 | 23.7 | 123 |
| | 1.0 | 120 | 117 | 23.5 | 125 |
| | 1.0 | 130 | 102 | 22.8 | 121 |
| comparative example 1 | 1.0 | 1.0 | 100 | 22.6 | 114 |

* anodizing voltage (EIAJ):22V

As is described above, the use of a deformed sine wave increases a uniform etch pit density during the current rising period and also prevents useless aluminum dissolving during the current falling period. This enables the etch pits to grow without waste and increases the electric capacity of the etched foil.

In addition, the waveform of the (a) portion of the deformed sine wave in FIG. 2 corresponds to the current rising portion (¼ period) of a sine wave having a frequency of 1/(4×a). The waveform of the (b) portion of the deformed sine wave corresponds to a current falling portion (¼ period) of a sine wave having a frequency corresponding to 1/(4×b). Therefore, a frequency of the deformed sine wave in FIG. 2 becomes 1/(2×(a+b)).

This means that, the waveform of the deformed sine wave can be regarded as a normal sine wave having the same frequency and the same peak current value with the position of the peak current value of the normal sine wave only shifted slightly. Therefore, the root-mean-square of current of the deformed sine wave is equal to the root-mean-square of current of the sine wave and the mean value of current of the deformed sine wave becomes equal to the mean value of current of the sine wave.

Consequently, an etching process employing a deformed sine waveform can be performed with the same root-mean-square value and peak value of current as used in performing an etching process employing a normal sine waveform, thereby allowing the production conditions of the etching process to be easily set.

Second Embodiment

Next, a description is given of a second embodiment of the present invention.

EXAMPLE 1

Figure 4:
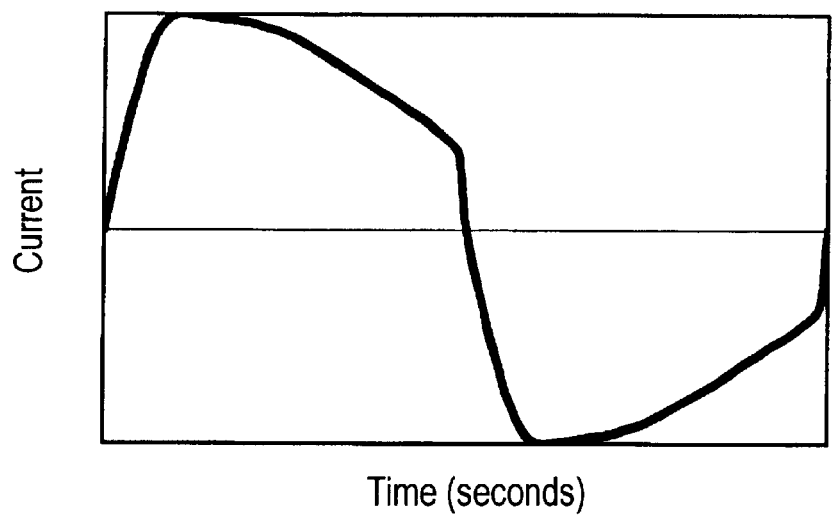
FIG. 4 is a waveform diagram illustrating a deformed sine wave of alternating currents used in Example 1 of a second embodiment of the present invention.

An etched foil is prepared in the same way as in the first embodiment except for using a waveform of the deformed sine wave having a zero current time during the period of time when the current falls as shown in FIG. 4. The AC current of the foregoing deformed sine wave is applied to the pair of electrodes from the AC power supply unit.

In this example, the period of time when the current of the deformed sine wave falls is set as 30 against the period of time when the current of the deformed sine wave rises which is set as 1. Further, the current density is 0.50 A/cm$^2$, and the frequency is 40 Hz.

EXAMPLE 2

Figure 5:
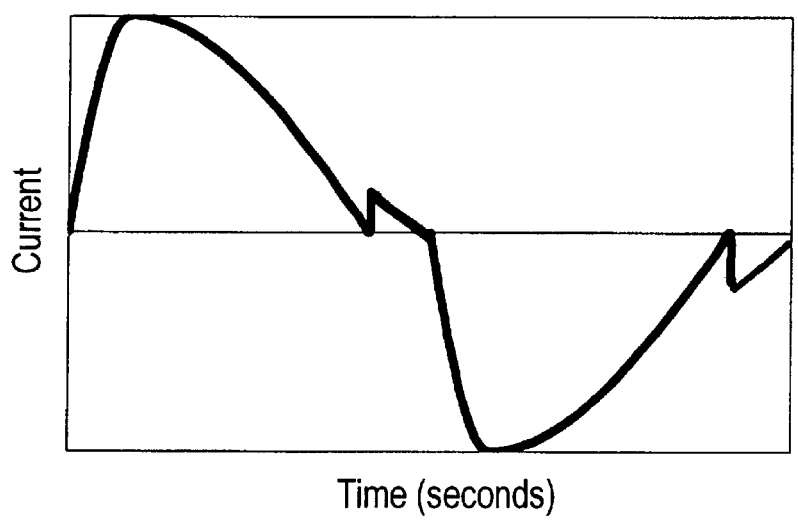
FIG. 5 is a waveform diagram illustrating a deformed sine wave of alternating currents used in Example 2 of the second embodiment of the present invention.

An etched foil is prepared in the same way as in the first embodiment except for using a waveform of the deformed sine wave having a different waveform current as shown in FIG. 5. The AC current of the foregoing deformed sine wave is applied to the pair of electrodes from the AC power supply unit.

In this example, the period of time when the current of the deformed sine wave falls is set as 30 against the period of time when the current of the deformed sine wave rises which is set as 1. Further, the current density of the different waveform is 0.10 A/cm$^2$ with a duration of 0.02 seconds.

EXAMPLE 3

Figure 6:
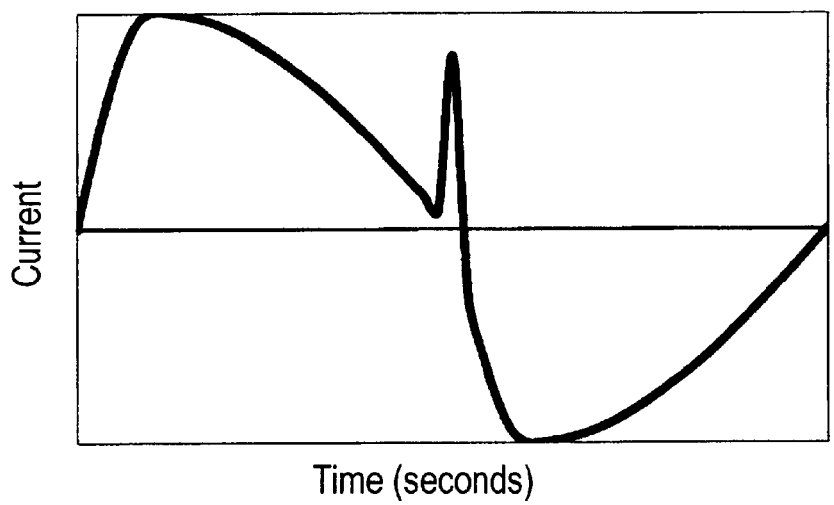
FIG. 6 is a waveform diagram illustrating a deformed sine wave of alternating currents used in Example 3 of the second embodiment of the present invention.

An etched foil is prepared in the same way as in the first embodiment except for using a waveform of the deformed sine wave having a pulse current with a peak current not exceeding the peak current of the deformed sine wave as shown in FIG. 6. The AC current of the foregoing deformed sine wave is applied to the pair of electrodes from the AC power supply unit.

In this example, the period of time when the current of the deformed sine wave falls is set as 30 against the period of time when the current of the deformed sine wave rises which is set as 1. Further, the current density is 0.50 A/cm$^2$, and the frequency is 40 Hz. In addition, the current density of the pulse current is 0.30 A/cm$^2$ with a duration of 0.0001 seconds.

EXAMPLE 4

Figure 7:
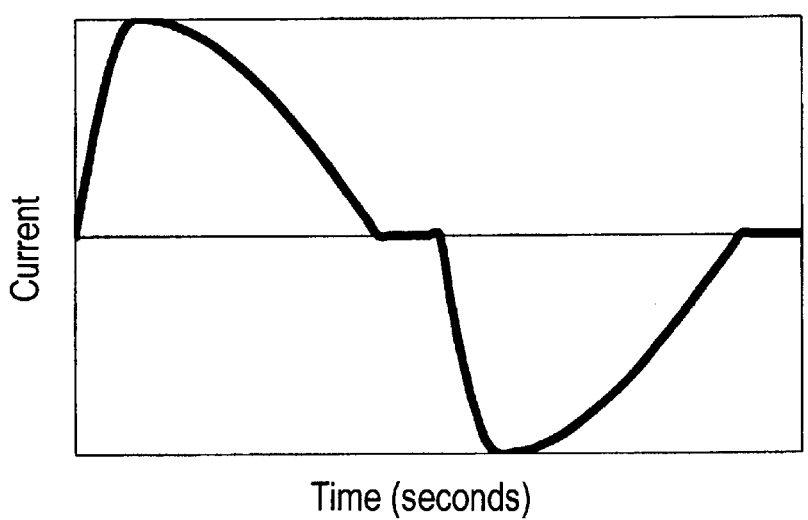
FIG. 7 is a waveform diagram illustrating a deformed sine wave of alternating currents used in Example 4 of the second embodiment of the present invention.

An etched foil is prepared in the same way as in the first embodiment except for using a waveform of the deformed sine wave having a duration when the current is zero as shown in FIG. 7. The AC current of the foregoing deformed sine wave is applied to the pair of electrodes from the AC power supply unit.

In this example, the period of time when the current of the deformed sine wave falls is set as 30 against the period of time when the current of the deformed sine wave rises which is set as 1. Further, the current density is 0.50 A/cm$^2$, the frequency is 40 Hz and the a duration of zero current is 0.02 seconds.

EXAMPLE 5

Figure 8:
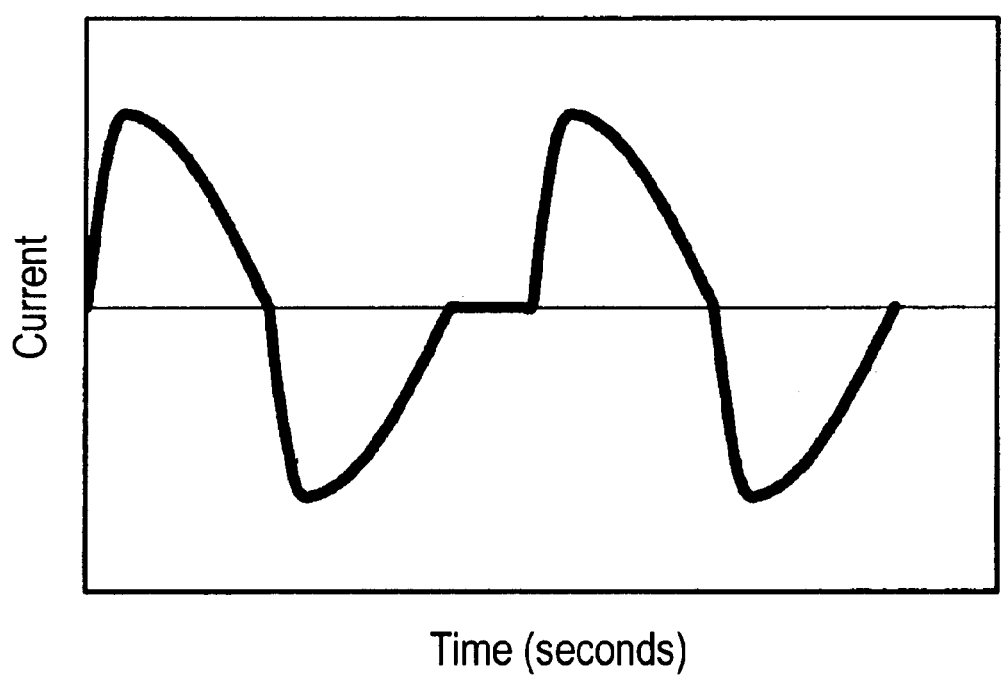
FIG. 8 is a waveform diagram illustrating a deformed sine wave of alternating currents used in Example 5 of the second embodiment of the present invention.

An etched foil is prepared in the same way as in the first embodiment except for using a waveform of the deformed sine wave having a duration when the current is zero, and the duration is shorter than one period of frequency of the deformed sine wave as shown in FIG. 8. The AC current of the foregoing deformed sine wave is applied to the pair of electrodes from the AC power supply unit.

In this example, the period of time when the current of the deformed sine wave falls is set as 30 against the period of time when the current of the deformed sine wave rises which is set as 1. Further, the current density is 0.50 A/cm$^2$, the frequency is 40 Hz and a duration of zero current is 0.01 seconds.

COMPARATIVE EXAMPLE 2

Etched foil is prepared to serve as a comparative example 2 in the same way as the comparative example 1.

Evaluation results of characteristics of the etched foil prepared in Examples 1 to 5 and in the comparative example 2 are shown in Table 2. The evaluation of the foregoing etched foil is conducted in the same way as in the first embodiment.

TABLE 2

|  |  | EIAJ (RC-2364A) test results | | |
|---|---|---|---|---|
|  |  | relative capacitance | film withstand voltage (Vt) | automatic bending test (times) |
| second embodiment | Example 1 | 115 | 23.6 | 124 |
|  | Example 2 | 112 | 23.4 | 120 |
|  | Example 3 | 111 | 23.2 | 122 |
|  | Example 4 | 113 | 23.4 | 123 |
|  | Example 5 | 114 | 23.8 | 120 |
| Comparative Example 2 |  | 100 | 22.7 | 112 |

* anodizing voltage (EIAJ):22V

As is clearly seen in Table 2, by etching an aluminum foil using the deformed sine AC currents having the previous discussed waveforms, etch pits grow in high density and a dissolving of aluminum foil surface can be suppressed. The deformed sine AC currents include such wave shapes as the current fall to zero during the current falling period, adding a different waveform to the deformed sine waveform, and providing a period of zero current time to the waveform of the deformed sine wave. Therefore, the surface area of aluminum foil expands more efficiently in comparison with the comparative example 2, thereby bringing about the advantage of enhancing the electric capacity of etched foil.

In addition, by providing an "off" period of current after a cathode current application, aluminum particles attached onto the surface of aluminum foil are dispersed, thereby facilitating the growth and expansion in diameter of etch pits with an application of an anode current carried out thereafter. As a result, the amount of electricity consumed in the next step of anodizing can be reduced.

Third Embodiment

Next, a description is given of a third embodiment of the present invention.

EXAMPLE 6

First, in a manufacturing method of electrode foil for aluminum electrolytic capacitors in the present example, a 100 µm thick and 99.98% purity aluminum foil is immersed in a 90° C. aqueous solution containing 1.0 wt % of phosphoric acid for 60 seconds as pretreatment.

Then, as a first etching process, the foregoing aluminum foil is immersed in an etching vessel filled with a 35° C. electrolytic solution containing 5 wt % of hydrochloric acid, 4 wt % of aluminum chloride, 0.1 wt % of sulfuric acid, 0.5 wt % of phosphoric acid and 0.2 wt % of nitric acid (with the aluminum ion concentration in the electrolytic solution adjusted to 1.10 wt %) and an etching process is performed by applying an AC current of a deformed sine wave to a pair of electrodes from an AC power supply unit for 150 seconds as shown in FIG. 1.

The current density is 0.50 A/cm$^2$ and the frequency is 45 Hz and, with the period of time when the current rises in the foregoing deformed sine wave taken as 1, the period of time when the current falls is set to 80 as shown in FIG. 2.

Then, as an intermediate treatment, the aluminum foil after the first etching process is immersed in a 85° C. aqueous solution containing 5 wt % of potassium phosphate, 0.05 wt % of sodium phosphate and 0.02 wt % of aluminum ion concentration for 3 minutes.

Subsequently, as a second etching process, the foregoing aluminum foil is immersed in an etching vessel filled with a 25° C. electrolytic solution containing 5 wt % of hydrochloric acid, 2 wt % of aluminum chloride, 0.1 wt % of sulfuric acid, 0.5 wt % of phosphoric acid and 0.2 wt % of nitric acid (with the aluminum ion concentration in the electrolytic solution adjusted to 0.10 wt %) and an etching process is performed by applying an AC current of a deformed sine wave to a pair of electrodes from an AC power supply unit for 150 seconds.

The current density is adjusted to 0.35 A/cm$^2$ and the frequency is set to 25 Hz and, with the period of time when the current rises in the foregoing deformed sine wave taken as 1, the period of time when the current falls is set to 40 as shown in FIG. 2.

Finally, the aluminum foil is immersed in a 60° C. aqueous solution containing 10 wt % of sulfuric acid for 100 seconds and then heat treated at 250° C. for 120 seconds, and the production of etched foil that serves as electrode foil for aluminum electrolytic capacitors is finished.

The AC power supply unit used in the first etching process and second etching process is the same one as used in the first embodiment. Although the aluminum foil undergoes the respective processes and treatments according to a batch system in the above descriptions, a continuous processing system can also be employed from the pretreatment to the final heat treatment with conveyor rollers installed above the respective treatment vessels.

EXAMPLE 7

Etched foil is prepared in the same way as in Example 6 except for a pretreatment of the aluminum foil in a 60° C. aqueous solution containing 2 wt % of sodium metasilicate for 60 seconds and then in an aqueous solution containing 5 wt % of hydrochloric acid for 90 seconds.

EXAMPLE 8

Etched foil is prepared in the same way as in Example 6 except for using ammonium phosphate in place of the potassium phosphate of the intermediate treatment and conducting the intermediate treatment at the aqueous solution temperatures of 40, 50, 60, 70, 80, 90 and 100° C., respectively.

EXAMPLE 9

Etched foil is prepared in the same way as in Example 6 except for conducting the intermediate treatment in a 85° C. aqueous solution containing 14 wt % of 2-ammonium adipate with a current density of 0.01 A/cm$^2$ and keeping the applied voltage at 0.2 V for 30 seconds after it reached to 0.2 V.

COMPARATIVE EXAMPLE 3

Etched foil is prepared in the same way as in Example 6 except for performing a first etching process and a second etching process by using the AC currents having a sine wave (the ratio between the period of time when the electric current rises from zero to a peak value and the period of time when the electric current falls from the peak value to zero is 1:1) as shown in FIG. 10 and washing the aluminum foil in water as an intermediate treatment.

Evaluation results of characteristics of the etched foil prepared in Examples 6 to 9 and in the comparative example 3 are shown in Table 3. The evaluation of the etched foil is conducted in the same way as in the first embodiment.

TABLE 3

| | | | EIAJ (RC-2364A) test results | | |
| --- | --- | --- | --- | --- | --- |
| | | | relative capacitance | film withstand voltage (Vt) | automatic bending test (times) |
| second embodiment | Example 6 | | 109 | 23.1 | 124 |
| | Example 7 | | 111 | 23.2 | 125 |
| | Example 8 | 40 | 103 | 22.9 | 122 |
| | | 50 | 108 | 23.3 | 124 |
| | | 60 | 110 | 23.2 | 126 |
| | | 70 | 112 | 23.4 | 123 |
| | | 80 | 114 | 23.3 | 125 |
| | | 90 | 107 | 23.0 | 124 |
| | | 100 | 102 | 23.2 | 123 |
| | Example 9 | | 111 | 23.3 | 125 |
| Comparative Example 3 | | | 100 | 22.7 | 115 |

* anodizing voltage (EIAJ):22V

As is clearly seen in Table 3, the etched foils prepared in the present embodiment show higher values in electric capacity than the etched foil of the comparative example 3. This is attributed to the fact that both the further growth of etch pits formed in the first etching process and the further production of etch pits are carried out at the same time, efficiently, in the second etching process, by making the current rise time of the deformed sine wave in the second etching process longer than the current rise time in the first etching process.

When a comparison is made between a case where aluminum foil is immersed only in an acidic aqueous solution before etching processing and a case where aluminum foil is immersed in an alkaline aqueous solution and in an acidic aqueous solution before etching processing, a higher electric capacity is obtained in the latter.

Although a specific value in electric current density is used in the present embodiment, the etch pit densities become higher by making the electric current density of the first etching process higher than the electric current density of the second etching process within a range of 0.012 to 2.55 A/cm$^2$. Thus, the electric capacity of resulting etched foil becomes higher.

Further, when the frequency of AC current for the first etching process is higher than the frequency of the second etching process within a range of 5 to 45 Hz, the etch pits are made higher in density, thereby allowing the electric capacity of resulting etched foil to be enhanced.

However, when the electric current density of the AC current exceeds 2.25 A/cm$^2$, the surface of aluminum foil is etched excessively, thereby preventing the surface area of aluminum foil to be expanded. On the other hand, when the current density is less than 0.012 A/cm$^2$, the etch pits do not distribute uniformly in location.

With respect to the frequency of the AC current, when the frequency exceeds 45 Hz, the surface of aluminum foil is etched excessively, thereby not leading to expansion of the surface area of aluminum foil. On the other hand, when the frequency is less than 5 Hz, the etch pits do not distribute uniformly in location.

With respect to the aluminum concentration in the electrolytic solution, when the aluminum ion concentration in the electrolytic solution for the first etching process is increased, the chemical dissolving on the surface of aluminum foil can be suppressed, thereby allowing the electric capacity to be enhanced. The optimum aluminum ion concentration ranges from 0.07 to 1.40 wt %.

By making aluminum ion existent in the electrolytic solution, resistance of the electrolytic solution is increased at the time of etching, thereby allowing the aluminum to be prevented from dissolving abruptly and excessively due to anode currents produced instantaneously. Also, by controlling the temperatures of the electrolytic solution, the electric conductivity of the electrolytic solution can be controlled so as to prevent a useless dissolving reaction of aluminum from taking place, thereby preventing a deviation in diameter of etch pits caused by an etching process.

With respect to the temperatures of the electrolytic solution, the etch pit density can be increased by lowering the temperatures of the electrolytic solution used in the second etching process without destroying the etch pits produced in the first etching process. The optimum temperature range is from 10 to 50° C.

A higher electric capacity than that of the etched foil prepared in the comparative example 3 is obtained by conducting an intermediate treatment between the steps of performing etching with an aqueous solution containing phosphoric acid derivatives at temperatures of the aqueous solution kept in the range of 50 to 90° C. When the temperature of the intermediate treatment is 40° C., a protective film is not formed sufficiently and, when the temperature is 100° C., the surface of each respective etch pit dissolves. The electric capacity can be increased somewhat when compared with the etched foil of the comparative example 3, but no remarkable advantages can be obtained.

More specifically, the intermediate treatment allows a protective film to cover the surface of each respective etch pit formed in the first etching process. This prevents the etch pits formed in the first etching processing from being destroyed by the second etching process and allows the surface area to be expanded effectively.

In addition, by having aluminum ions dissolved into an aqueous solution containing phosphoric acid derivatives, the formation of a protective film on the surface of each respective etch pit produced in the first etching process can be easily made. Particularly, when the intermediate treatment is repeated several times, it is preferred that the aluminum ion concentration is increased stepwise every time the intermediate treatment is repeated. The optimum aluminum ion concentration ranges from 0.0015 to 0.08 wt %.

When the temperatures of an aqueous solution containing phosphoric acid derivatives exceed 90° C., the surface of each respective etch pit dissolves, and the surface area of aluminum foil does not expand in the following etching process. On the other hand, when the temperatures are below 50° C., the protective film does not form in a short period.

Furthermore, when the aluminum ion concentration in an aqueous solution containing phosphoric acid derivatives exceeds 0.08 wt %, a thin protective film is formed and etch pits are eroded in the following etching process. Conversely, when the aluminum concentration is less than 0.0015 wt %, a protective film is not formed with resultant dissolving of etch pits.

Even when an intermediate treatment is conducted in an aqueous solution containing organic acid and an anodizing is performed within a voltage ranging from 0.05 to 1.8 V, the same advantages as in the foregoing exemplary embodiments are obtained.

Fourth Embodiment

Next, a description is given of a fourth embodiment of the present invention.

A method of manufacturing electrode foil for electrolytic capacitors in the present embodiment starts with a step of immersing 99.98% purity and 100 μm thick aluminum foil in a 90° C. aqueous solution containing 1.0 wt % of phosphoric acid for 60 seconds.

Then, as a first etching process, the aluminum foil is immersed in an etching vessel filled with a 35° C. electrolytic solution containing 5 wt % of hydrochloric acid, 4 wt % of aluminum chloride, 0.1 wt % of sulfuric acid, 0.5 wt % of phosphoric acid and 0.2 wt % of nitric acid (with the aluminum ion concentration in the electrolytic solution adjusted to 0.17 wt %) and an AC current of a deformed sine wave is applied to a pair of electrodes from an AC power supply unit for 100 seconds as shown in FIG. 1.

The current density of AC current from the AC power supply unit is 0.50 A/cm$^2$ and the frequency is 40 Hz. The period of time when the current rises in the deformed sine wave is taken as 1, and the period of time when the current falls is set to 80 as shown in FIG. 2.

Then, as an intermediate treatment, the aluminum foil after the first etching process, is immersed in an aqueous solution containing 5 wt % of potassium phosphate, 0.05 wt % of sodium phosphate and 0.02 wt % of aluminum ion concentration for 3 minutes with the temperature of the aqueous solution kept at 85° C.

Subsequently, as a second etching process, the aluminum foil is immersed in an etching vessel filled with a 30° C. electrolytic solution containing 5 wt % of hydrochloric acid, 2 wt % of aluminum chloride, 0.1 wt % of sulfuric acid, 0.5 wt % of phosphoric acid and 0.2 wt % of nitric acid (with the aluminum ion concentration in the electrolytic solution adjusted to 0.10 wt %) and an AC current of a deformed sine wave is applied to a pair of electrodes from an AC power supply unit for 100 seconds. The current density is 0.35 A/cm$^2$ and the frequency is 30 Hz, with the period of time when the current rises in the foregoing deformed sine wave is taken as 1, the period of time when the current falls is set to 40 as FIG. 2 shows.

Next, as another intermediate treatment, the aluminum foil is immersed in a 85° C. aqueous solution containing 5 wt % of potassium phosphate, 0.05 wt % of sodium phosphate and 0.02 wt % of aluminum ion.

Thereafter, as a third etching process, the aluminum foil is immersed in an etching vessel filled with a 20° C. electrolytic solution containing 5 wt % of hydrochloric acid, 1 wt % of aluminum chloride, 0.1 wt % of sulfuric acid, 0.5 wt % of phosphoric acid and 0.2 wt % of nitric acid (with the aluminum ion concentration in the electrolytic solution adjusted to 0.07 wt %) and an AC current of a deformed sine wave is applied to a pair of electrodes from an AC power supply unit for 100 seconds.

The current density is 0.25 A/cm$^2$ and the frequency is 20 Hz, with the period of time when the current rises in the foregoing deformed sine wave taken as 1, the period of time when the current falls is set to 40, 30, 20, 10, 1.0, 0.5 and 0.1, respectively.

Finally, the aluminum foil undergoes an immersion treatment in a 60° C. aqueous solution containing 10 wt % of sulfuric acid for 100 seconds and then a heat treatment at 250° C. for 120 seconds, thereby finishing the production of etched foil that serves as electrode foil for aluminum electrolytic capacitors.

The AC power supply unit used in the first etching process, the second etching process and the third etching process, respectively, is the same one as used in the first embodiment. Although the aluminum foil undergoes the respective processes and treatments according to a batch system in the above descriptions, a continuous processing system can also be employed from the pretreatment to the final heat treatment with conveyor rollers installed above the respective treatment vessels.

COMPARATIVE EXAMPLE 4

Etched foil is prepared in the same way as in the fourth embodiment except for performing the first etching process, the second etching process and the third etching process by using the waveform of an AC current having a sine wave as shown in FIG. 10 and washing the aluminum foil in water as the intermediate treatment.

Evaluation results of characteristics of the etched foil prepared in the fourth embodiment and in the comparative example 4 are shown in Table 4. The evaluation of the etched foil is conducted in the same way as in the first embodiment.

TABLE 4

|  | Time ratio of deformed sign wave | | EIAJ (RC-2364A) test results | | |
|---|---|---|---|---|---|
|  | rise | fall | relative capacitance | film withstand voltage (Vt) | automatic bending test (times) |
| fourth embodiment | 1.0 | 40 | 115 | 23.6 | 114 |
|  | 1.0 | 30 | 113 | 23.4 | 115 |
|  | 1.0 | 20 | 111 | 23.5 | 115 |
|  | 1.0 | 1 | 109 | 23.3 | 114 |
|  | 1.0 | 1.0 | 106 | 23.4 | 113 |
|  | 1.0 | 0.5 | 105 | 23.2 | 114 |
|  | 1.0 | 0.1 | 103 | 23.1 | 112 |
| Comparative Example 4 | 1.0 | 1.0 | 100 | 22.0 | 110 |

* anodizing voltage (EIAJ):22V

As is clearly seen in Table 4, the etched foil prepared by making the period of time when the deformed sine wave falls in the third etching process shorter than the period of time when the deformed sine wave falls in the first and second etching processes, allows for a higher value in electric capacity to be obtained.

This is attributed to the fact that the growth of etch pits formed in the first and second etching processes is promoted, and at the same time more etch pits are produced efficiently by reducing the gradient of the rising portion the deformed sine wave for the third etching process.

When the step of performing an etching process is repeated at least twice or more, the surface area of aluminum foil can be further expanded by reducing the current density and the frequency of the AC current as the number of repeating times of performing the etching process increases. As a result, etch pits can be formed in high density. The ranges for current density and frequency most suitable for etching are 0.012 to 2.55 A/cm$^2$ and 5 to 45 Hz, respectively.

Also, by lowering the temperatures of an aqueous solution used in an etching process as the number of repeating times of performing the etching process increases, the density of etch pits can be increased without destroying etch pits. The optimum temperature range is 10 to 50° C.

Fifth Embodiment

Next, a description is given of a fifth embodiment of the present invention.

A method of manufacturing electrode foil for electrolytic capacitors in the present embodiment starts with a pretreatment step of immersing 100 μm thick and 99.98% purity aluminum foil in a 90° C. aqueous solution containing 1.0 wt % of phosphoric acid for 60 seconds.

Then, the aluminum foil is immersed in an etching vessel filled with a 30° C. electrolytic solution containing 5 wt % of hydrochloric acid, 2 wt % of aluminum chloride, 0.1 wt % of sulfuric acid, 0.5 wt % of phosphoric acid and 0.2 wt % of nitric acid (with the aluminum ion concentration in the electrolytic solution adjusted to 0.1 wt %) and an AC current of a deformed sine wave is applied to a pair of electrodes for 300 seconds as shown in FIG. 1.

The current density is 0.50 A/cm$^2$ and the frequency is 40 Hz, with the period of time when the current rises in the deformed sine wave is taken as 1, the period of time when the current falls is set to 100 as shown in FIG. 2.

Then, the aluminum foil undergoes an immersion treatment in a 60° C. aqueous solution containing 10 wt % of sulfuric acid for 100 seconds and subsequently a hydrating treatment in a 50° C. aqueous solution containing 0.1 wt % of ethanolamine. Thereafter, the aluminum foil undergoes a heat treatment at 250° C. for 3 minutes in such an atmosphere as nitrogen (with an oxygen concentration of 1.0%), argon (with an oxygen concentration of 2.0%), hydrogen (with an oxygen concentration of 1.0%) or air, thereby preparing etched foils in different heat treatment conditions.

Evaluation results of characteristics of the etched foil prepared as described above are shown in Table 5. The evaluation of the etched foil is conducted in the same way as in the first embodiment.

TABLE 5

| | | EIAJ (RC-2364A) test results | | |
| --- | --- | --- | --- | --- |
| | | relative capacitance | film withstand voltage (Vt) | automatic bending test (times) |
| fifth embodiment | nitrogen atmosphere | 115 | 23.6 | 124 |
| | argon atmosphere | 114 | 23.5 | 125 |
| | hydrogen atmosphere | 115 | 23.5 | 124 |
| | air atmosphere | 100 | 22.6 | 114 |

* anodizing voltage (EIAJ):22V

As is clearly seen in Table 5, the hydrate film formed in the hydrating treatment and heat treated in inert gas atmospheres makes an anodized film with a more uniform and closely packed structure in the following step. As a result, a remarkable enhancement of electric capacity and leakage current characteristics for anode foil can be obtained.

By conducting the heat treatment in a nitrogen gas atmosphere, an argon gas atmosphere or a hydrogen gas atmosphere, rather than in the air, a remarkable enhancement of electric capacity and leakage current characteristics for anode foil can be obtained.

This result assumes that, when a heat treatment is performed in an oxygen rich atmosphere, an extra amount of oxide film is formed by the oxygen in the atmosphere at the time when a hydrate film is transformed to an oxide film, thereby making it rather hard for an anodized film to create a closely packed structure in the anodizing process. By preventing the forming of an extra amount of oxide film by a reduction of oxygen in the atmosphere used in the heat treatment, as in the present embodiment, an anodized film with a closely packed structure can be produced, thereby enhancing the electric capacity and leakage current characteristics of anode foil.

Sixth Embodiment

Next, a description is given of a sixth embodiment of the present invention.

EXAMPLE 10

A method of manufacturing electrode foil for electrolytic capacitors in the present example starts with a pretreatment step of immersing 100 μm thick and 99.98% purity aluminum foil in a 90° C. aqueous solution containing 1.0 wt % of phosphoric acid for 60 seconds.

Then, in the same way as in the first embodiment, the aluminum foil is immersed in an etching vessel filled with a 30° C. electrolytic solution containing 5 wt % of hydrochloric acid, 2 wt % of aluminum chloride, 0.1 wt % of sulfuric acid, 0.5 wt % of phosphoric acid and 0.2 wt % of nitric acid (with the aluminum ion concentration in the electrolytic solution adjusted to 0.1 wt %) and an AC current of a deformed sine wave is applied to a pair of electrodes for 300 seconds from an AC power supply unit to perform an etching process.

The current density is 0.50 A/cm$^2$ and the frequency is 40 Hz, with the period of time when the current rises in the deformed sine wave is taken as 1, the period of time when the current falls is set to 100 as shown in FIG. 2.

Also, at the time when the etching process is performed, the voltage across the pair of electrodes is measured using of a voltmeter and the measurement results are fed back to the AC power supply unit, thereby controlling the AC current applied to the pair of electrodes to be constant.

Figure 9:
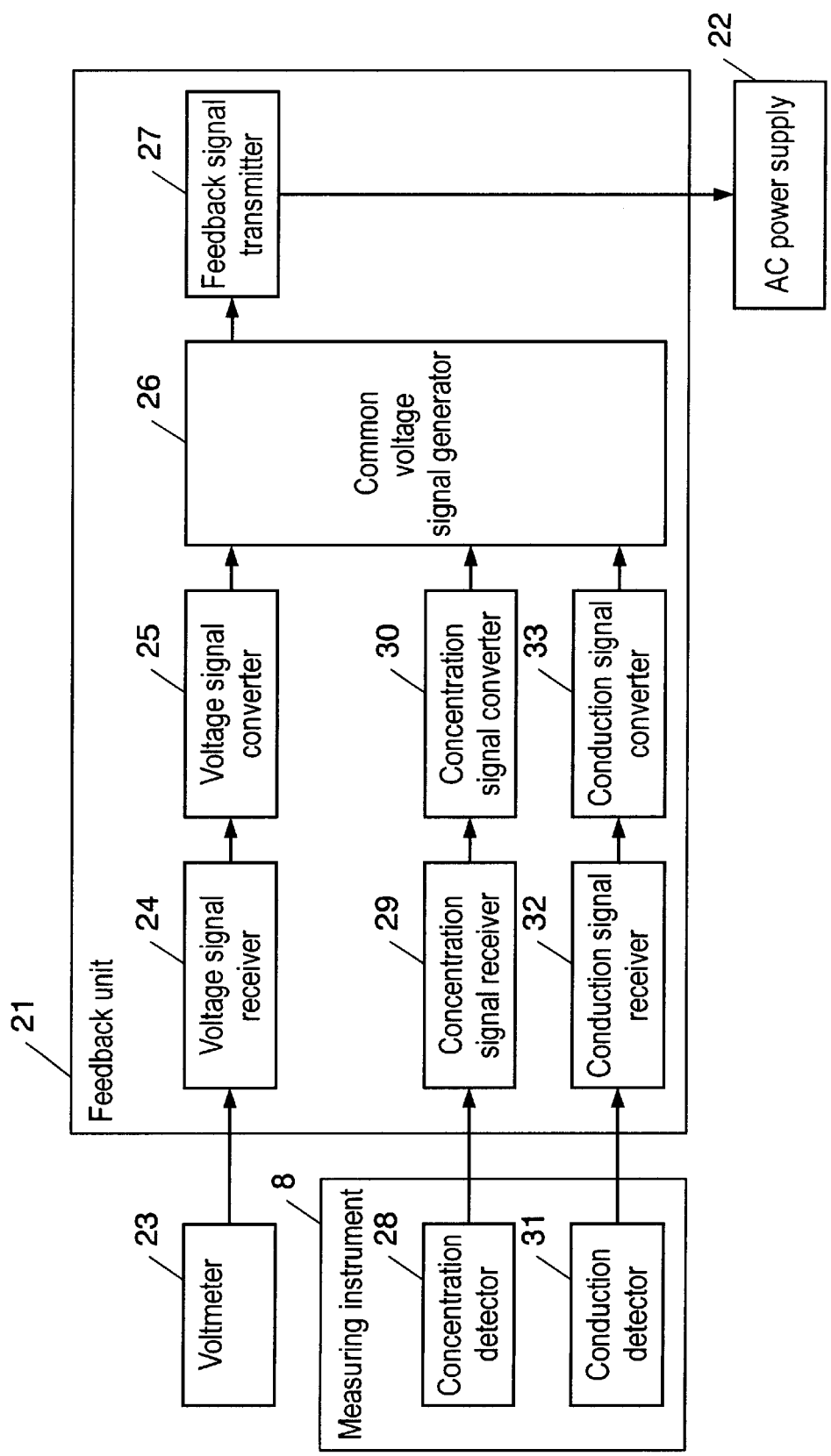
FIG. 9 is an illustration of a block diagram of a feedback unit used in sixth embodiment of the present invention.

FIG. 9 is a block diagram showing a structure to feedback the voltage between the pair of electrodes to the AC power supply unit. In FIG. 9, a voltage between the pair of electrodes measured by a voltmeter 23 is sent to a voltage signal receiver 24 and is converted in a voltage signal converter 25. The converted signal is further sent to a voltage signal generator 26 to be changed to a common signal, which is transmitted to AC power supply unit 22 via a feedback signal transmitter 27.

Finally, the aluminum foil undergoes an immersion treatment in a 60° C. aqueous solution containing 10 wt % of sulfuric acid for 100 seconds and then a heat treatment at 250° C. for 120 seconds, thereby finishing the production of etched foil that serves as electrode foil for aluminum electrolytic capacitors.

EXAMPLE 11

In Example 10, instead of measuring a voltage between the electrodes, a measurement of conductivity of the electrolytic solution in the etching vessel is conducted using a conductivity detector, and the measurement results are fed back to the AC power supply unit, thereby controlling the AC current applied to the electrodes to be constant. (See FIG. 9.)

EXAMPLE 12

In Example 10, instead of measuring a voltage between the electrodes, a measurement of concentrations of aluminum of the electrolytic solution in the etching vessel is conducted using a concentration detector and the measurement results are fed back to the AC power supply unit, thereby controlling the AC current applied to the electrodes to be constant. (See FIG. 9.)

COMPARATIVE EXAMPLE 5

Etched foil for electrode foil for aluminum electrolytic capacitors is produced in the same way as in Example 10 except for eliminating the controlling of the AC power supply unit.

Evaluation results of characteristics of the etched foil prepared in the Examples 10 to 12 and in the comparative example 5 are shown in Table 6. The evaluation of the etched foil is conducted in the same way as in the first embodiment.

TABLE 6

| | | EIAJ (RC-2364A) test results | | |
|---|---|---|---|---|
| | | relative capacitance | film withstand voltage (Vt) | automatic bending test (times) |
| sixth embodiment | Example 10 | 115 | 23.6 | 124 |
| | Example 11 | 114 | 23.5 | 125 |
| | Example 12 | 115 | 23.5 | 124 |
| Comparative | Example 5 | 100 | 22.1 | 111 |

\* anodizing voltage (EIAJ):22V

As is clearly seen in Table 6, by controlling the current of the AC power supply unit to be constant, the respective etching treatments are conducted under optimum conditions, thereby enhancing the electric capacity per unit amount of dissolved aluminum foil efficiently. As a result, the electric capacity of etched foil increases efficiently.

Although a description is given in the above explanation about the case where the current of the AC power supply unit is controlled, even by controlling frequencies or waveforms of the output of the AC power supply unit, an advantage of enhancing the electric capacity of etched foil can be obtained.

When the etching treatments are performed continuously by the use of a plurality of etching vessels, the electric current of the AC power supply unit can be controlled by means of a voltmeter connected the electrodes of each respective etching vessel or by means of a conductivity detector or an aluminum concentration detector installed in the electrolytic solution of the etching vessel.

As described above, according to the present invention, uniform and closely packed etch pits are produced during the period of time when a current rises form zero to a peak value in an etching process of aluminum foil. During the next period of time when a current falls from the peak value to zero, the etch pits grow to a higher density. As a result, the surface area of aluminum foil is expanded efficiently, thereby leading to an advantage of enhancing the electric capacity of electrode foil for aluminum electrolytic capacitors.

In consideration of a chemical dissolving reaction, an electrochemical reaction and a diffusion phenomenon, the present invention makes it possible to expand the surface area of aluminum foil efficiently by controlling the current density and frequencies of AC current at the time of the etching process, and also by controlling the temperature and aluminum concentration in the electrolytic solution.

Although, the description given of the above exemplary embodiments deals with the cases where the main ingredient of the electrolytic solution is hydrochloric acid and other additive electrolytes such as aluminum chloride, sulfuric acid, phosphoric acid and nitric acid are added, other commercially available electrolytes such as oxalic acid and the like well-known electrolytes may be added.

What is claimed is:

1. A method of manufacturing electrode foil, said method comprising:

etching an aluminum foil by applying an alternating current to electrodes in an electrolytic solution in which the aluminum foil is located, the alternating current having a waveform of a deformed sine wave, wherein a period of time when an electric current rises from zero to a peak current value differs from a period of time when the electric current falls from the peak current value to zero in the alternating current; and repeating said etching of the aluminum foil at least once, wherein the electrolytic solution is at a lower temperature at said second etching of the aluminum foil than at said first etching of the aluminum foil.

2. A method of manufacturing electrode foil, said method comprising:

etching an aluminum foil by applying an alternating current to electrodes in an electrolytic solution in which the aluminum foil is located, the alternating current having a waveform of a deformed sine wave, wherein a period of time when an electric current rises from zero to a peak current value differs from a period of time when the electric current falls from the peak current value to zero in the alternating current; and repeating said etching of the aluminum foil at least once, wherein an electric current density at said second etching of the aluminum foil is lower than the electric current density at said first etching of the aluminum foil.

3. A method of manufacturing electrode foil, said method comprising:

etching an aluminum foil by applying an alternating current to electrodes in an electrolytic solution in which the aluminum foil is located, the alternating current having a waveform of a deformed sine wave, wherein a period of time when an electric current rises from zero to a peak current value differs from a period of time when the electric current falls from the peak current value to zero in the alternating current; and subjecting the aluminum foil to a hydration treatment and a heat treatment in one of an inert gas atmosphere and a reducing gas atmosphere after said etching.

4. The method according to claim 3, wherein, with the period of time when the electric current rises being set as 1, the period of time when the electric current falls ranges from 1.05 to 120.

5. The method according to claim 1, wherein at a portion of the deformed sine wave, where the electric current falls from the peak current value, the electric current is zero.

6. The method according to claim 1, wherein on the waveform of the alternating current an electric current of a different waveform is superimposed.

7. A method of manufacturing electrode foil, said method comprising etching an aluminum foil by applying an alternating current to electrodes in an electrolytic solution in which the aluminum foil is located, the alternating current having a waveform of a deformed sine wave, wherein a period of time when an electric current rises from zero to a peak current value differs from a period of time when the electric current falls from the peak current value to zero in the alternating current, the waveform of the alternating current has zero electric current for a predetermined time duration, and the deformed sine wave is free of a flat portion at the peak current value.

8. A method of manufacturing electrode foil, said method comprising etching an aluminum foil by applying an alternating current to electrodes in an electrolytic solution in which the aluminum foil is located, the alternating current having a waveform of a deformed sine wave, wherein a period of time when an electric current rises from zero to a peak current value differs from a period of time when the electric current falls from the peak current value to zero in the alternating current, the waveform of the alternating current has zero electric current for a predetermined time shorter than one period of frequency of the alternating current, and the deformed sine wave is free of a flat portion at the peak current value.

9. The method according to claim 1, further comprising performing at least one intermediate treatment to form a protective film on the aluminum foil between said at least two etching treatments.

10. The method according to claim 1, further comprising treating the aluminum foil with an alkaline aqueous solution and an acidic aqueous solution before said etching.

11. The method according to claim 1, further comprising subjecting the aluminum foil to a hydration treatment and a heat treatment in one of an inert gas atmosphere and a reducing gas atmosphere after said etching.

12. The method according to claim 11, wherein the one of the inert gas and the reducing gas is one selected from a group consisting of argon, nitrogen and hydrogen.

13. The method according to claim 9, further comprising reducing a frequency of the alternating current for said at least two etching treatments as a number of said at least two etching treatments increases, the frequency ranging from 5 to 45 Hz.

14. The method according to claim 9, wherein a current density for said at least two etching treatments ranges from 0.012 to 2.55 A/cm$^2$.

15. The method according to claim 9, wherein an aluminum ion concentration in the electrolytic solution ranges from 0.07 to 1.4 wt %.

16. The method according to claim 9, wherein a temperature of the electrolytic solution ranges from 10 to 50° C.

17. The method according to claim 9, wherein said at least one intermediate treatment is performed in an aqueous solution containing a phosphoric acid derivative.

18. The method according to claim 17, wherein a temperature of the aqueous solution ranges from 50 to 90° C.

19. The method according to claim 17, wherein an aluminum ion concentration of the aqueous solution ranges from 0.0015 to 0.08 wt %.

20. The method according to claim 9, wherein said at least one intermediate treatment is an anodizing performed in an organic acid aqueous solution.

21. The method according to claim 20, wherein an anodizing voltage of said anodizing ranges from 0.05 to 1.8 V.

22. The method according to claim 1, further comprising controlling the alternating current by feeding a voltage applied to the electrodes back to an AC power supply unit to control the alternating current.

23. The method according to claim 1, further comprising controlling the alternating current by feeding an electric conductivity of the electrolytic solution back to an AC power supply unit to control the alternating current.

24. The method according to claim 1, further comprising controlling the alternating current by feeding an aluminum concentration of the electrolytic solution back to an AC power supply unit to control the alternating current.

25. The method according to claim 22, wherein said controlling of the alternating current is carried out by changing at least one of an output current, a frequency and the waveform of the alternating current.

26. The method according to claim 23, wherein said controlling of the alternating current is carried out by changing at least one of an output current, a frequency and the waveform of the alternating current.

27. The method according to claim 24, wherein said controlling of the alternating current is carried out by changing at least one of an output current, a frequency and the waveform of the alternating current.

* * * * *